US008668388B1

(12) United States Patent
Peterson

(10) Patent No.: US 8,668,388 B1
(45) Date of Patent: Mar. 11, 2014

(54) BEARING ASSEMBLIES, APPARATUSES, AND MOTOR ASSEMBLIES USING THE SAME

(75) Inventor: S. Barrett Peterson, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 51 days.

(21) Appl. No.: 13/306,332

(22) Filed: Nov. 29, 2011

(51) Int. Cl.
*F16C 33/10* (2006.01)
*F16C 17/00* (2006.01)

(52) U.S. Cl.
USPC ............. 384/322; 384/26; 384/42; 384/123; 384/316

(58) Field of Classification Search
USPC .............. 384/26, 42, 121–123, 306–308, 384/312–313, 316, 322, 368
See application file for complete search history.

(56) References Cited

U.S. PATENT DOCUMENTS

| | | | | |
|---|---|---|---|---|
| 3,549,214 A | * | 12/1970 | Neilson | 384/95 |
| 3,806,209 A | * | 4/1974 | Laing et al. | 384/104 |
| 3,829,180 A | * | 8/1974 | Gardner | 384/306 |
| 3,905,657 A | * | 9/1975 | Ishida et al. | 384/307 |
| 4,323,286 A | * | 4/1982 | Vohr | 384/317 |
| 4,662,348 A | * | 5/1987 | Hall et al. | 125/30.01 |
| 4,699,524 A | * | 10/1987 | Bath | 384/306 |
| 4,734,020 A | * | 3/1988 | Inaba et al. | 418/55.6 |
| 4,738,550 A | * | 4/1988 | Gardner | 384/306 |
| 4,789,251 A | | 12/1988 | McPherson et al. | |
| 5,092,687 A | * | 3/1992 | Hall | 384/303 |
| 5,253,939 A | | 10/1993 | Hall | |
| 5,394,655 A | * | 3/1995 | Allen et al. | 451/63 |
| 5,664,890 A | * | 9/1997 | Nowak et al. | 384/282 |
| 5,743,654 A | * | 4/1998 | Ide et al. | 384/100 |
| 6,460,635 B1 | * | 10/2002 | Kalsi et al. | 384/95 |
| 6,746,152 B2 | * | 6/2004 | Branagan | 384/122 |
| 7,255,480 B2 | | 8/2007 | John et al. | |
| 7,559,695 B2 | * | 7/2009 | Sexton et al. | 384/42 |
| 7,866,418 B2 | | 1/2011 | Bertagnolli et al. | |
| 7,998,573 B2 | | 8/2011 | Qian et al. | |
| 2003/0039417 A1 | * | 2/2003 | Aguilar | 384/121 |
| 2005/0047690 A1 | * | 3/2005 | Keramati et al. | 384/368 |
| 2006/0288579 A1 | * | 12/2006 | Luo et al. | 29/898.12 |
| 2008/0115421 A1 | | 5/2008 | Sani | |
| 2010/0310201 A1 | * | 12/2010 | Zeidan | 384/420 |

OTHER PUBLICATIONS

U.S. Appl. No. 11/545,929, filed Oct. 10, 2006, Bertagnolli.
U.S. Appl. No. 13/166,007, filed Jun. 22, 2011, Chapman et al.

* cited by examiner

*Primary Examiner* — Marcus Charles
(74) *Attorney, Agent, or Firm* — Dorsey & Whitney LLP

(57) ABSTRACT

Embodiments of the invention are directed to bearing assemblies including one or more superhard bearing elements having one or more grooves formed in a bearing surface thereof, apparatuses, and motor assemblies using the same. In an embodiment, a bearing assembly includes a plurality of superhard bearing elements distributed circumferentially about an axis. Each of the superhard bearing elements includes a bearing surface. At least one of the plurality of superhard bearing elements includes one or more grooves formed in the bearing surface thereof. The bearing assembly also includes a support ring that carries the superhard bearing elements.

25 Claims, 10 Drawing Sheets

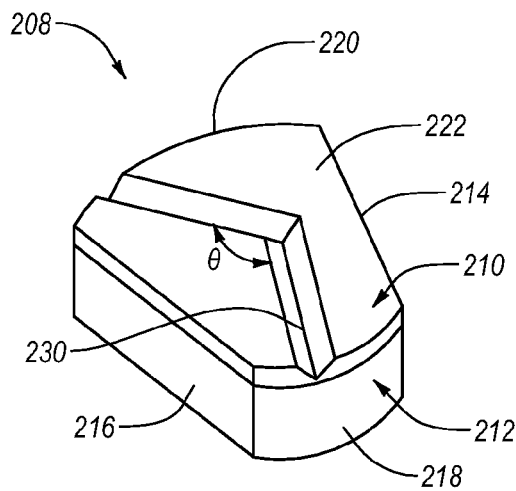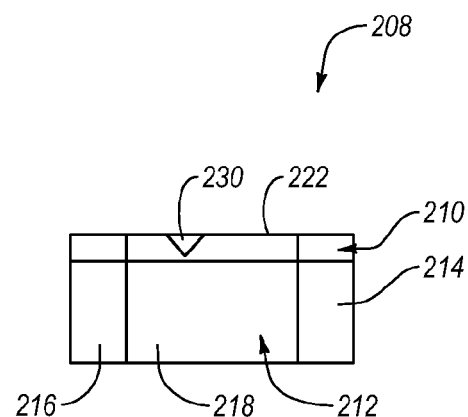
*Fig. 2A*  *Fig. 2B*
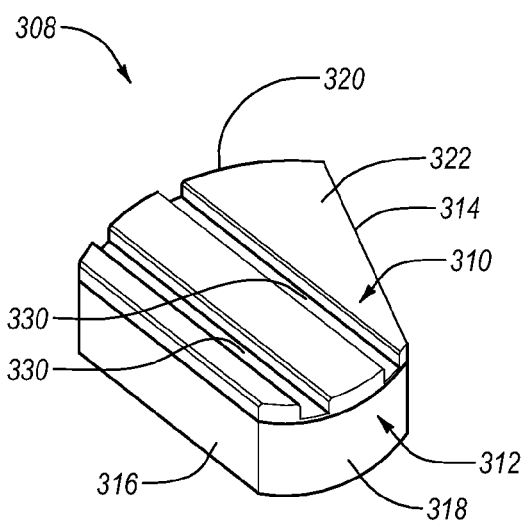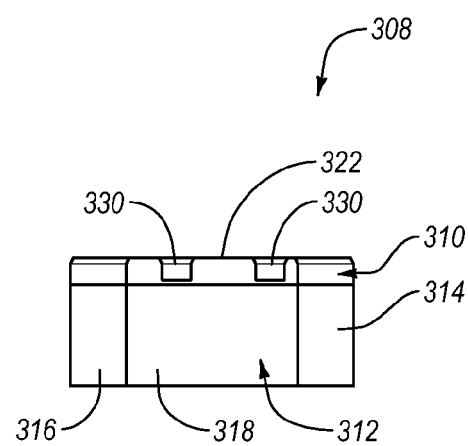
*Fig. 3A*  *Fig. 3B*

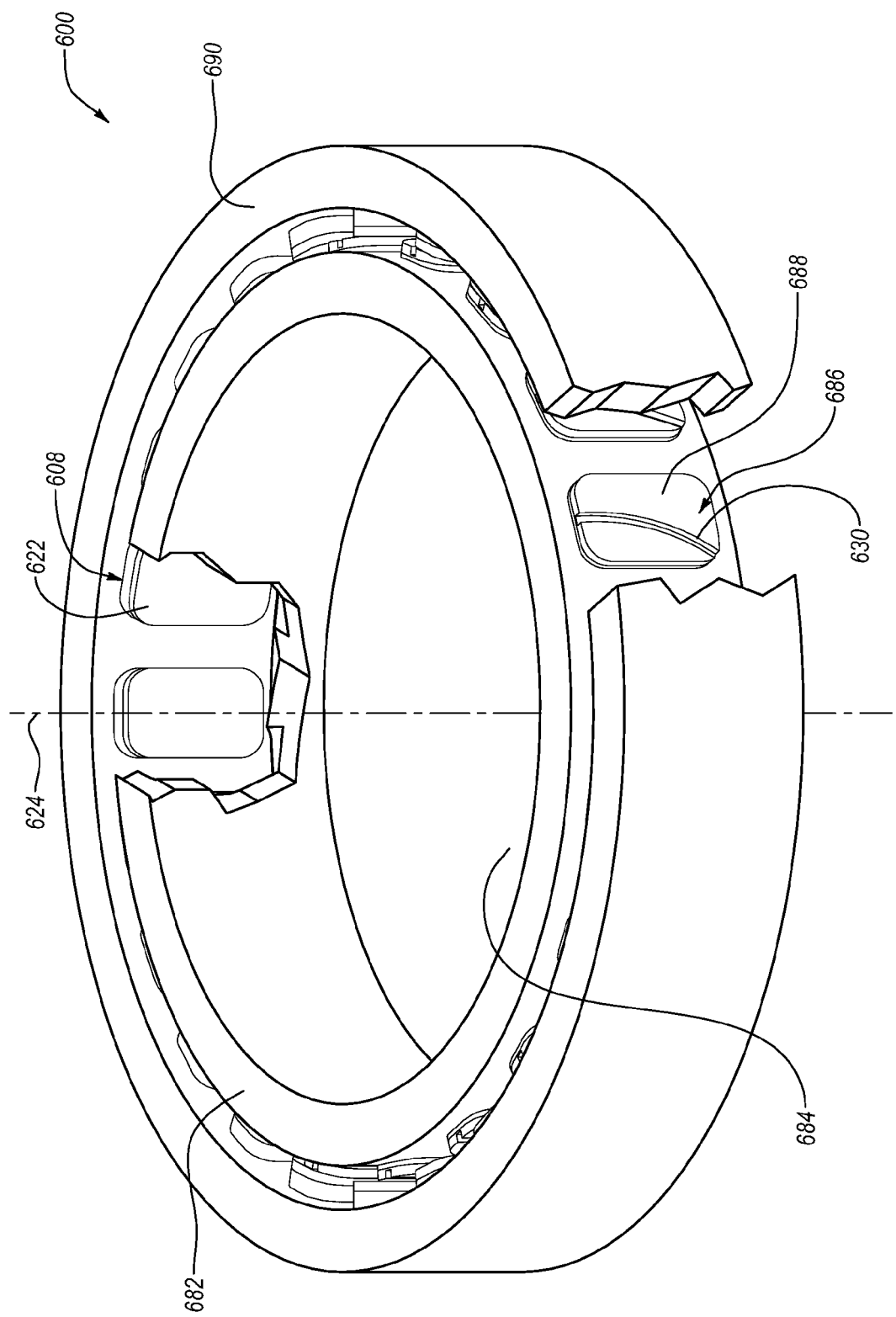

BEARING ASSEMBLIES, APPARATUSES, AND MOTOR ASSEMBLIES USING THE SAME

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole can be connected to the output shaft. As the borehole is drilled with the rotary drill bit, pipe sections may be connected to the subterranean drilling system to form a drill string capable of progressively drilling the borehole to a greater size or depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to help cool and lubricate the bearing elements of the thrust-bearing apparatuses, however, cooling and lubricating the bearing elements can be problematic, in part, because of inadequate surface area on each bearing element exposed to the drilling fluid and/or circulating air.

The on-bottom and off-bottom thrust carried by the thrust-bearing apparatuses can also be extremely large and generate significant amounts of energy. The operational lifetime of the thrust-bearing apparatuses often can determine the useful life of the subterranean drilling system.

SUMMARY

Various embodiments of the invention relate to bearing assemblies, bearing apparatuses and motor assemblies that include superhard bearing elements having features configured to improve lubrication and/or cooling of the superhard bearing elements. When the superhard bearing elements are closely-spaced from or abutting each other to form a quasi/substantially continuous bearing surface, the superhard bearing elements may not be able to effectively cool during use so at least some of the superhard bearing elements may be provided with one or more grooves formed therein to promote lubrication and/or cooling during use.

In an embodiment, a bearing assembly may include a plurality of superhard bearing elements (e.g., cylindrical or non-cylindrical superhard bearing elements) distributed circumferentially about an axis. Each of the superhard bearing elements may include a bearing surface. At least one of the plurality of superhard bearing elements may include one or more grooves (e.g., one or more arcuate grooves) may be formed in the bearing surface thereof. The bearing assembly may also include a support ring that carries the superhard bearing elements. In an embodiment, the one or more grooves may be positioned and configured to pump lubricating fluid onto the bearing surfaces of one or more of the superhard bearing elements. In an embodiment, the one or more grooves may be configured to increase surface area of the bearing surfaces in contact with lubricating fluid.

In an embodiment, a bearing apparatus may include two bearing assemblies. At least one of the two bearing assemblies may be configured as any of the disclosed bearing assembly embodiments that are configured to improve lubrication and/or cooling of the superhard bearing elements during use.

In an embodiment, a method for manufacturing a bearing assembly may include forming one or more grooves (e.g., one or more arcuate grooves) in a bearing surface of a superhard bearing element. The method may include securing the superhard bearing element to a support ring. In an embodiment, the one or more grooves may be formed before securing the superhard bearing element to the support ring. In an embodiment, the one or more grooves may be formed after securing the superhard bearing element to the support ring. In an embodiment, forming the one or more grooves may include laser-cutting the grooves in the bearing surface. In an embodiment, forming the one or more grooves may include using a sacrificial material to at least partially define the one or more grooves in the bearing surface.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 2A is an isometric view of a superhard bearing element according to an embodiment.

FIG. 2B is a front elevation view of the superhard bearing element shown in FIG. 2A.

FIG. 3A is an isometric view of a superhard bearing element according to an embodiment.

FIG. 3B is a front elevation view of the superhard bearing element shown in FIG. 3A.

FIG. 6 is an isometric cutaway view of a radial bearing apparatus that may utilize any of the disclosed radial bearing assemblies according to various embodiments.

DETAILED DESCRIPTION

Figure 1A:
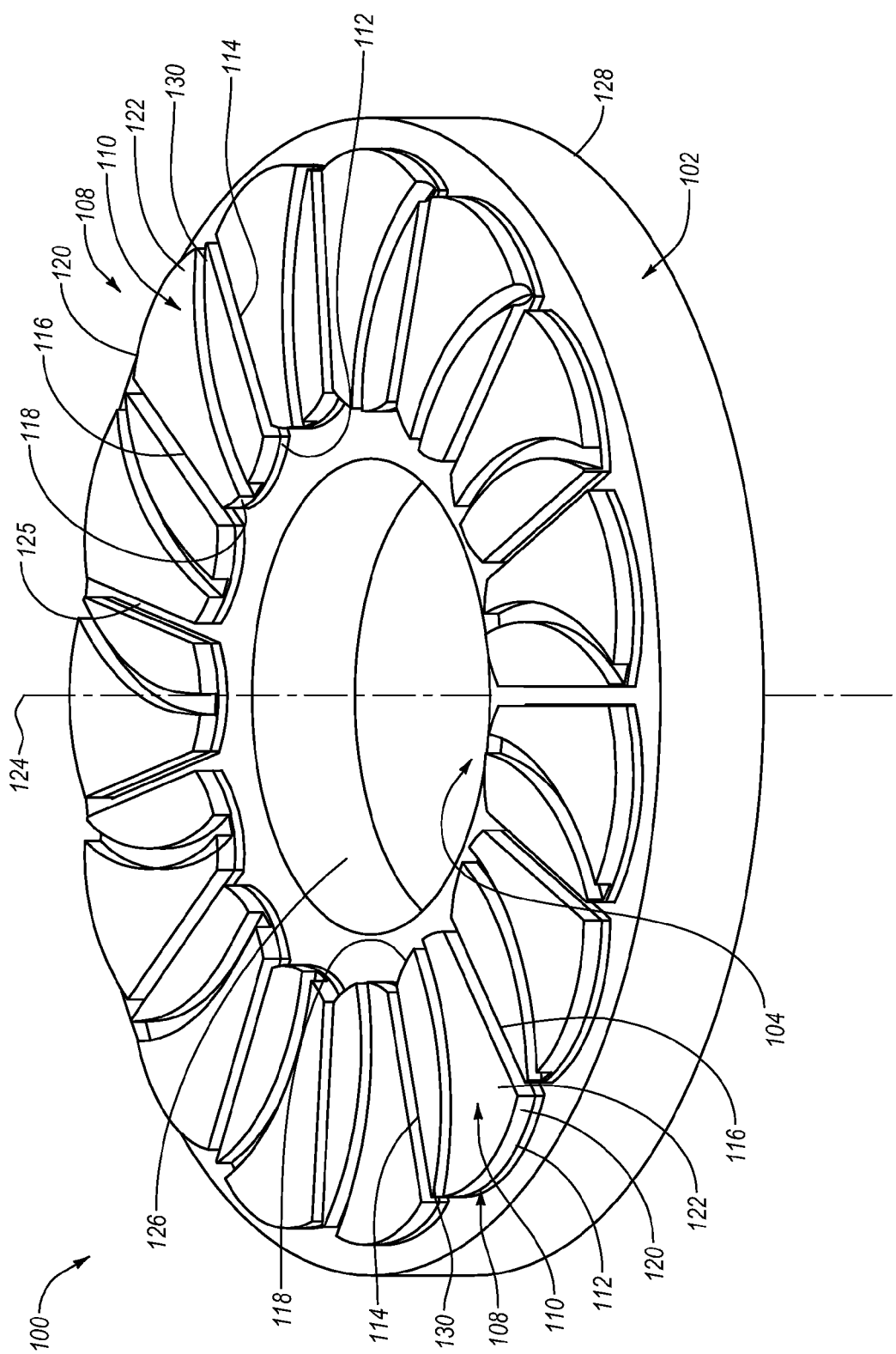
FIG. 1A is an isometric view of a thrust-bearing assembly according to an embodiment.
Figure 1B:
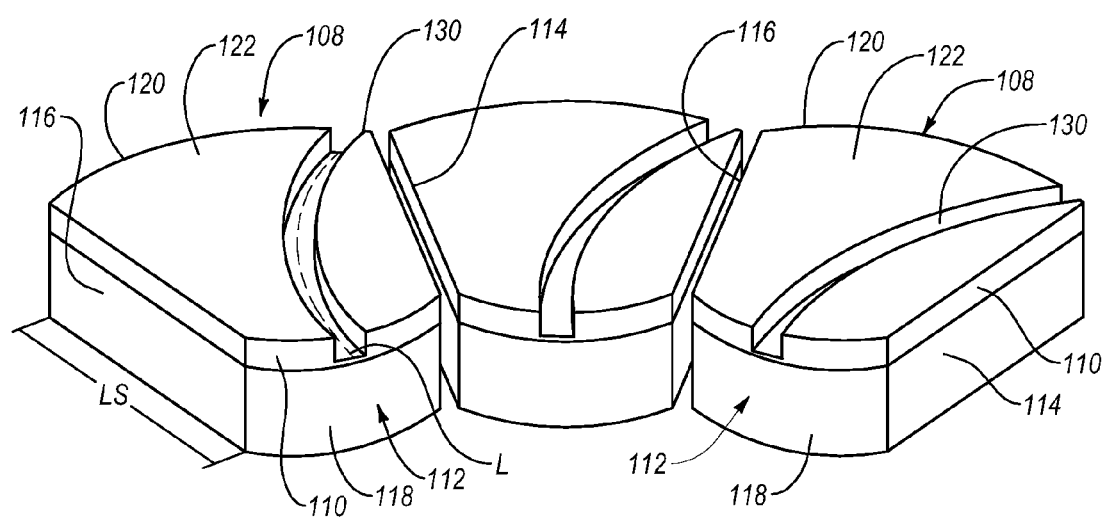
FIG. 1B is an isometric view of three side-by-side superhard bearing elements removed from the thrust-bearing assembly shown in FIG. 1A.

Embodiments of the invention relate to bearing assemblies, bearing apparatuses and motor assemblies that include superhard bearing elements having features configured to improve lubrication and/or cooling of the superhard bearing elements. When the superhard bearing elements are closely-spaced or abutting each other to form a quasi/substantially continuous bearing surface, the superhard bearing elements may not be able to effectively cool so at least some of the superhard bearing elements may be provided with one or more grooves formed therein to promote lubrication and/or cooling during use. FIG. 1A is an isometric view of a thrust-bearing assembly according to an embodiment. FIG. 1B is an isometric view of three adjacent superhard bearing elements removed from the thrust-bearing assembly shown in FIG. 1A.

The thrust-bearing assembly 100 may form a stator or a rotor of a thrust-bearing apparatus used in a subterranean drilling system. As shown in FIGS. 1A and 1B, the thrust-bearing assembly 100 may include a support ring 102 defining an opening 104 through which a shaft (not shown) of, for example, a downhole drilling motor may extend. The support ring 102 may be made from a variety of different materials. For example, the support ring 102 may comprise carbon steel, stainless steel, tungsten carbide, copper, or any other suitable conductive or non-conductive material. The support ring 102 may include a plurality of recesses 106 (shown in FIG. 1F) formed therein.

The thrust-bearing assembly 100 further may include a plurality of superhard bearing elements 108. As shown in FIG. 1B, the superhard bearing elements 108 may include a superhard table 110 bonded to a substrate 112 including a first side surface 114, a second side surface 116, a first end surface 118, a second end surface 120, and a bearing surface 122 of the superhard table 110. The superhard bearing elements 108 are illustrated in FIG. 1A being distributed circumferentially about a thrust axis 124 along which a thrust force may be generally directed during use. As shown in FIGS. 1A and 1D, gaps 125 may be located between adjacent ones of the superhard bearing elements 108. In an embodiment, at least one of, some of, or all of the gaps 125 may exhibit a width of about 0.00020 inches to 0.100 inches, such as about 0.00040 inches to 0.0010 inches, or about 0.00040 inches to 0.080 inches. In other embodiments, the gaps 125 may have widths that are relatively larger or smaller. In other embodiments, the gaps 125 may substantially be zero and the adjacent ones of the superhard bearing elements 108 may abut each other.

Each of the superhard bearing elements 108 may be partially disposed in a corresponding one of the recesses 106 (shown in FIG. 1F which is an isometric cutaway view taken along line 1F-1F of the thrust-bearing assembly shown in FIG. 1D) of the support ring 102 and secured partially therein via brazing, press-fitting, threadly attaching, fastening with a fastener, combinations of the foregoing, or another suitable technique. As used herein, a "superhard bearing element" is a bearing element including a bearing surface that is made from a material exhibiting a hardness that is at least as hard as tungsten carbide.

In any of the embodiments disclosed herein, the superhard bearing elements 108 may be made from one or more superhard materials, such as polycrystalline diamond, polycrystalline cubic boron nitride, silicon carbide, tungsten carbide, or any combination of the foregoing superhard materials. For example, the superhard table 110 may be formed from polycrystalline diamond and the substrate 112 may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials from which the superhard bearing elements can be made are disclosed in U.S. Pat. Nos. 7,866,418 and 7,998,573; and co-pending U.S. patent application Ser. Nos. 11/545,929 and 11/983,619; the contents of each of the foregoing patents and applications are incorporated herein, in their entirety, by this reference.

The diamond particles that may be used to fabricate the superhard table 110 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. The result polycrystalline diamond formed from HPHT sintering the aforementioned diamond particles may also exhibit the same or similar diamond grain size distributions and/or sizes as the aforementioned diamond particle distributions and particle sizes.

Additionally, in any of the embodiments disclosed herein, the superhard bearing elements 108 may be free-standing (e.g., substrateless) and formed from a polycrystalline diamond body that is at least partially or fully leached to remove a metal-solvent catalyst initially used to sinter the polycrystalline diamond body.

Referring now to FIG. 1B, the first side surface 114 and the second side surface 116 of each of the superhard bearing elements 108 may extend between the first end surface 118 and the second end surface 120 and vice versa. At least one of the superhard bearing elements 108 may have a length LS defined between the first end surface 118 and the second end surface 120. In an embodiment, the first side surface 114 and the second side surface 116 may be non-parallel to each other such that the superhard bearing elements 108 have a wedge-like shape. In other embodiments, the first side surface 114 and the second side surface 116 may be configured such that the superhard bearing elements 108 have a generally rectangular shape, a generally oval shape, another non-cylindrical shape, a generally cylindrical shape, or another suitable configuration. In the illustrated embodiment, both the first end surface 118 and the second end surface 120 may have a convex curvature.

As shown in FIG. 1B, the second end surface 120 may have a convex curvature to at least partially complement an outer peripheral surface 128 of the support ring 102. In other embodiments, the first end surface 118 and the second end surface 120 may have symmetrical edge configurations, asymmetrical edge configurations, curved edge configurations, irregular edge configurations, or other edge configurations. For example, the first end surface 118 and the second end surface 120 may take the form of any portion of a circle, oval, square, rectangle, rhombus, triangle, or virtually any other simple, complex, regular, irregular, symmetrical, or non-symmetrical geometric shape. Moreover, the first end surface 118 may have an area greater than an area of the second end surface 120, although this feature is not necessary. In other embodiments, the first end surface 118 and the second end surface 120 may be substantially the same size.

The bearing surface 122 of the superhard table 110 may extend between the first end surface 118, the second end surface 120, the first side surface 114, the second side surface 116, and may be substantially planar and generally lie in common plane (shown in FIG. 1F) with the bearing surfaces 122 of the other superhard bearing elements 108. The superhard bearing elements 108 may be pre-machined to tolerances and mounted in the support ring 102 and/or mounted to the support ring 102 and the bearing surfaces 122 thereof and planarized (e.g., by lapping and/or grinding) so that the bearing surfaces 122 are substantially coplanar. As shown in FIG. 1A, the superhard bearing elements 108 may be arranged substantially adjacent to one another to form a quasi-continuous bearing surface. Optionally, one or more of the superhard bearing elements 108 may exhibit a peripherally extending edge chamfer. However, in other embodiments, the edge chamfer may be omitted.

At least some of the superhard bearing elements 108 may include at least one feature (e.g., at least one groove) configured to pump lubricating fluid onto the bearing surface 122 and/or influence cooling of the superhard bearing elements 108. When the superhard bearing elements 108 are closely-spaced from or abutting each other to form a quasi/substantially continuous bearing surface of the individual bearing surfaces 122, the superhard bearing elements 108 may not be able to effectively cool during use. Therefore, in an embodiment, a groove 130 may be formed in the bearing surface 122 to promote effective cooling and/or lubrication during use. The groove 130 may be formed by electro-discharge machining ("EDM"), laser-cutting, grinding, combinations thereof, or otherwise machining the groove 130 in the bearing surface 122 before or after securing the superhard bearing elements 108 to the support ring 102. For example, suitable laser-cutting techniques are disclosed in U.S. application Ser. No. 13/166,007 filed on Jun. 22, 2011, the disclosure of which is incorporated herein, in its entirety by this reference.

In other embodiments, the groove 130 may be formed in the bearing surface 122 by using a sacrificial material to define the groove 130 in the bearing surface 122 during formation (i.e., sintering) of the superhard table 110. The sacrificial material may include metals (e.g., tungsten), alloys (e.g., tungsten alloys), ceramics (e.g., tungsten carbide), combinations thereof, or the like. Once the groove 130 is defined in the bearing surface, the sacrificial material may be removed via leaching, thermal decomposition, combinations thereof, or other removal techniques.

The groove 130 may follow a generally arcuate path with a length L that extends generally between the first end surface 118 and the second end surface 120. In other embodiments, the length L of the groove 130 may extend along only a portion of the bearing surface 122. For example, the length of the groove 130 may extend between the first end surface 118 and an intermediate point between the first end surface 118 and the second end surface 120. In another embodiment, the length L of the groove 130 may extend between the first end surface 118 and the first side surface 114. Moreover, while the groove 130 is illustrated following a generally arcuate path, the groove 130 may follow a generally semi-cylindrical path, a generally s-shaped path, a generally u-shaped path, a generally v-shaped path, a generally linear path, or the like.

In an embodiment, the length L of the grooves 130 may be about 0.3 inches to about 2 inches, such as about 0.5 inches to about 1 inch. However, in other embodiments, the length L of the grooves 130 may be longer or shorter than the foregoing ranges. As illustrated, each of the grooves 130 may have at least substantially the same length L. However, in other embodiments, some or all of the grooves 130 may have substantially different lengths L, respectively. For example, in an embodiment, the superhard bearing elements 108 may include a first group of grooves 130 having lengths L of about 1 inch and a second group of grooves 130 having lengths L of about 0.5 inches.

While all the superhard bearing elements 108 are shown including substantially identical grooves 130, in other embodiments, only a portion of the superhard bearing elements 108 may have substantially identical grooves 130 and/or the superhard bearing elements 108 may have grooves 130 of varying sizes and configurations.

Figure 1C:
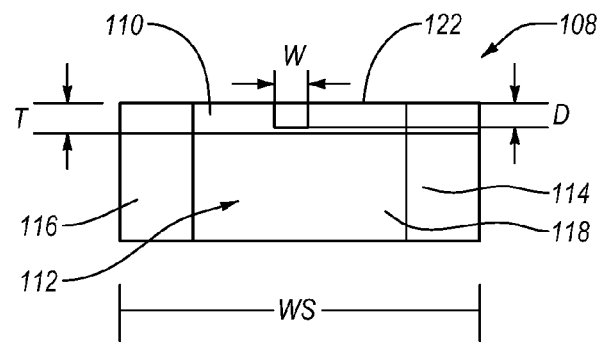
FIG. 1C is a front elevation view of one of the superhard bearing elements shown in FIG. 1B.
Figure 1D:
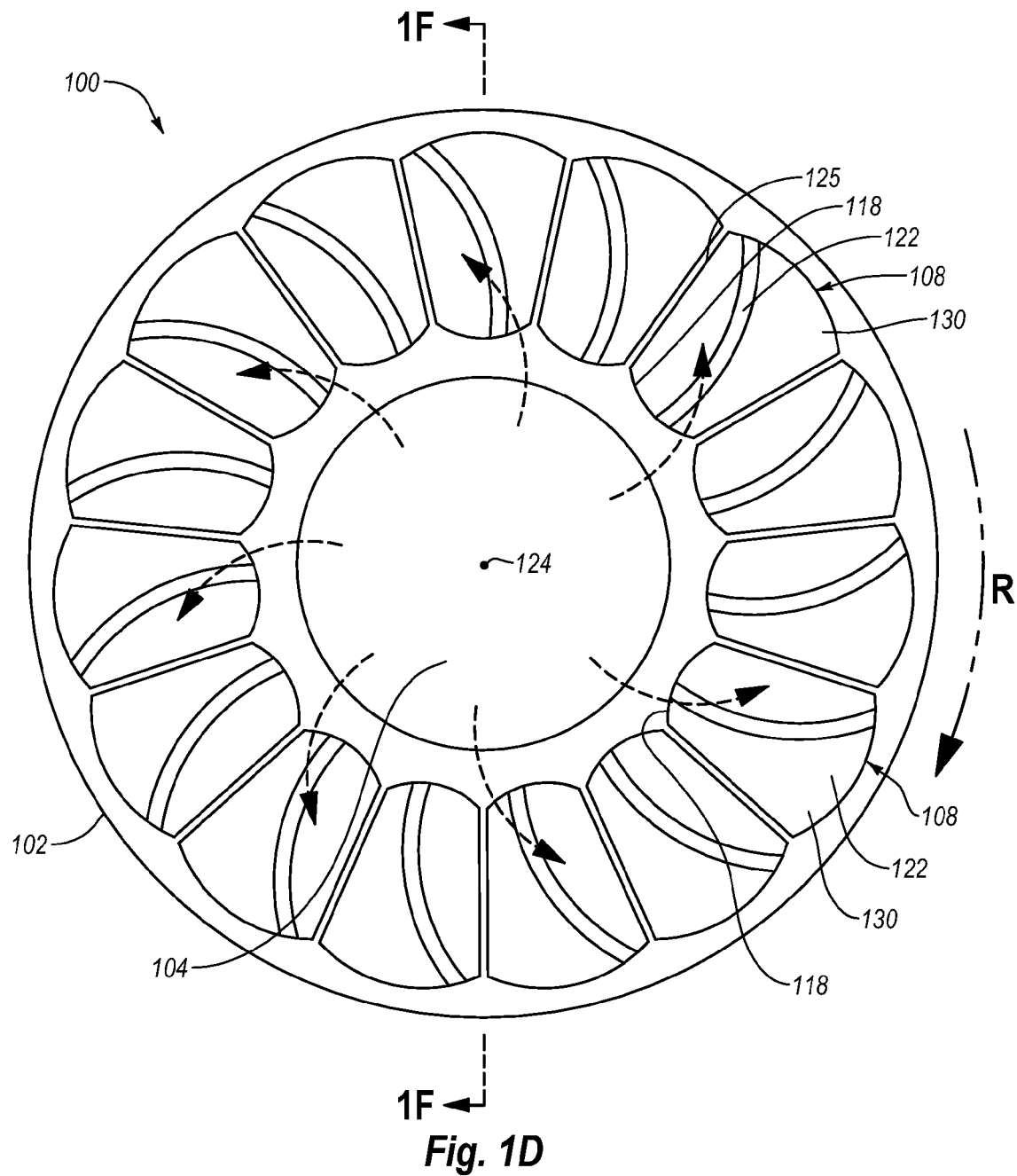
FIG. 1D is a top plan view of the thrust-bearing assembly shown in FIG. 1A.

FIG. 1C is a front view of one of the superhard bearing elements 108 shown in FIG. 1B. The superhard bearing elements 108 may have a generally uniform width WS which is substantially less than the length LS of the superhard bearing elements 108, although it will be appreciated that these dimensions are illustrative only.

In an embodiment, the relationship between the length L of the grooves 130 and the length LS of the superhard bearing elements 108 may be configured to help increase lubrication and/or cooling of the superhard bearing elements 108. For example, increasing the length L of one or more of the grooves 130 relative to the length LS of one or more of the superhard bearing elements 108 may increase the percentage of surface area of the bearing surfaces 122 and/or the superhard bearing elements 108 in contact with the lubricating fluid to help cool the superhard bearing elements 108. The length L of at least one of the grooves 130 may be at least: about ninety (90) percent; about one hundred (100) percent; about one hundred and ten (110) percent; about one hundred and twenty (120) percent; about one hundred and thirty (130) percent; about one hundred and forty (140) percent; or about one hundred and fifty (150) percent of the width LS of the superhard bearing elements 108. In other embodiments, the length L of one or more of the grooves 130 may be about forty (40) percent to about one hundred and forty (140) percent; about fifty (50) percent to about one hundred and thirty (130) percent; or at least about one hundred and twenty (120) percent of the length LS of at least one of the superhard bearing elements 108. In other embodiments, the length L of one or more of the grooves 130 and the length LS of one or more of the superhard bearing elements 108 may be larger or smaller relative to each other.

Similar to the relationship between the length L of the grooves 130 and the length LS of the superhard bearing elements 108, the relationship between the length L of one or more of the grooves 130 and the width WS of one or more of the superhard bearing elements 108 may be configured to help increase lubrication and/or cooling of the superhard bearing elements 108. For example, the length L of at least one of the grooves 130 may be at least: about ninety (90) percent; about one hundred (100) percent; about one hundred and ten (110) percent; about one hundred and twenty (120) percent; about one hundred and thirty (130) percent; about one hundred and forty (140) percent; or about one hundred and fifty (150) percent of the width WS of at least one of the superhard bearing elements 108. In other embodiments, the length L of at least one of the grooves 130 may be between about one hundred (100) percent and about one hundred and forty (140) percent; or between about one hundred and ten (110) percent and about one hundred and thirty (130) percent, or about one hundred and twenty (120) percent of the width WS of at least one of the superhard bearing elements 108. In other embodiments, the length L of one or more of the grooves 130 and the width WS of one or more of the superhard bearing elements 108 may be larger or smaller relative to each other.

Significantly, by reducing friction and/or increasing heat dissipation (i.e., cooling), the grooves 130 may reduce wear of the superhard bearing elements 108 and help prolong the useful life of the superhard bearing elements 108.

Referring still to FIG. 1C, each of the grooves 130 may be further defined by a bottom portion and opposing sidewalls. The grooves 130 may include straight edges formed at the intersection of the opposing sidewalls and the bearing surface 122. In other embodiments, the grooves 130 may include beveled edges, rounded edges, chamfered edges, or the like.

As illustrated, the grooves 130 may have a generally rectangular cross-section. In other embodiments, the grooves 130 may have a generally v-shaped cross-section, a generally u-shaped cross-section, a generally circular shaped cross-section, a generally parabolic shaped cross-section, a generally trapezoidal shaped cross-section, combinations thereof, or the like. The cross-section of the grooves 130 may influence the pumping of the lubricating fluid and/or the cooling of the superhard bearing elements 108. For example, in an embodiment, at least one of the grooves 130 may have a portion including a v-shaped cross-section configured to improve cooling of the superhard bearing element 108 and lubrication of the bearing surface 122 by increasing the fluid velocity of the lubricating fluid through that portion of the groove 130. In other embodiments, the grooves 130 may include a first deeper cross-sectional shape followed by a second shallower cross-sectional shape to pump or impel the lubricating fluid onto the bearing surfaces 122.

As illustrated in FIG. 1C, at least one of the grooves 130 may have a width W and a depth D. Variations of the depth D and/or the width W of the grooves 130 may help the grooves 130 lubricate and/or cool the superhard bearing elements 108.

The depth D of the grooves 130 may extend between the bottom portion of the grooves 130 and the bearing surface 122. For example, the depth D may be about 0.1 inches to about 0.4 inches, such as about 0.15 inches to about 0.25 inches. As illustrated, the grooves 130 may have at least substantially the same depth D. However, in other embodiments, the grooves 130 may have at least substantially different depths D. In addition, the depths D of a groove 130 may vary along its path. For example, at least one of the grooves 130 may have a depth D that includes a deeper portion and a shallower portion. As also shown in FIG. 1C, the superhard table 110 may have a thickness T defined between an upper surface of the substrate 112 and the bearing surface 122 of the superhard table 110.

In an embodiment, the relationship between the depth D of the grooves 130 and the thickness T of the superhard table 110 may be configured to improve lubrication and/or cooling of the superhard bearing elements 108. For example, the depth D of at least one of the grooves 130 may be about ten (10) percent to about one hundred twenty (120) percent; about forty (40) percent to about one hundred (100) percent; about fifty (50) percent to seventy (70) percent; about fifty-five (55) percent to about sixty-five (65) percent of the thickness T of the superhard table 110. In another embodiment, the depth D of at least one of the grooves 130 may be at least about forty (40) percent, at least about fifty (50) percent, at least about sixty (60) percent, about seventy (70) percent, at least about eighty (80) percent, at least one hundred (100) percent of the thickness T of the superhard table 110. In other embodiments, the depth D of the grooves 130 and the thickness T of the superhard table 110 may be larger or smaller relative to each other. For example, in an embodiment, the depth D of the grooves 130 may extend entirely through the thickness T of the superhard table 110 and substantially within the substrate 112.

As shown in FIG. 1C, the width W of the grooves 130 may extend between the opposing sidewalls of the grooves 130. In an embodiment, the width of the grooves 130 may be about 0.1 inches to about 0.5 inches, such as about 0.2 inches to about 0.3 inches. In other embodiments, the widths W of the grooves 130 may be wider or narrower. As illustrated, the grooves 130 may have at least substantially the same width W. However, in other embodiments, some or all of the grooves 130 may have substantially different widths W. In addition, the widths W of the grooves 130 may vary. For example, at least one of the grooves 130 may have a width W that includes a narrower portion and a wider portion near the first end surface 118. Such a configuration may provide the grooves 130 with a wider inlet for the lubricating fluid.

In an embodiment, the relationship between the width W of the grooves 130 and the width WS of the superhard bearing elements 108 may be configured to improve lubrication and/or cooling of the superhard bearing elements 108. For example, the width W of the grooves 130 and the width WS of the superhard bearing elements 108 may be at least: about ten (10) percent; about fifteen (15) percent; about twenty (20) percent; about twenty-five (25) percent; or about thirty (30) percent of the width WS of the superhard bearing elements 108. In addition, the width W of the grooves 130 may be about ten (10) percent to about thirty (30) percent; or about fifteen (15) percent to about twenty-five (25) percent; or at least about twenty (20) percent of the width WS of the superhard bearing elements 108. In other embodiments, the width W of the grooves 130 and the width WS of the superhard bearing elements 108 may be larger or smaller relative to each other.

In an embodiment, the relationship between the length L of one or more of the grooves 130 and the depth D of one or more of the grooves 130 may be configured to improve lubrication and/or cooling of the superhard bearing elements 108. For example, the length L of at least one of the grooves 130 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the depth D of at least one of the grooves 130. In addition, the length L of at least one of the grooves 130 may be: about four hundred (400) percent to eight hundred (800) percent; or about five hundred (500) percent to seven hundred (700) percent of the depth of the grooves 130; or about six hundred (600) percent of the depth D of at least one of the grooves 130. In other embodiments, the depth D of one or more of the grooves 130 and the length L of one or more of the grooves 130 may be larger or smaller relative to each other.

In an embodiment, the relationship between the length L of one or more of the grooves 130 and the width W of one or more of the grooves 130 may be configured to improve lubrication and/or cooling of the superhard bearing elements 108. For example, the length L of at least one of the grooves 130 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the width W of at least one of the grooves 130. In addition, the length L of at least one of the grooves 130 may be: about four hundred (400) percent to about eight hundred (800) percent; or about five hundred (500) percent to about seven hundred (700) percent; or at least about six hundred (600) percent of the width W of at least one of the grooves 130. In other embodiments, the width W of one or more of the grooves 130 and the length L of one or more of the grooves 130 may be larger or smaller relative to each other.

In an embodiment, the relationship between the depth D of one or more of the grooves 130 and the width W of the one or more of the grooves 130 may be configured to improve lubrication and/or cooling of the superhard bearing elements 108. For example, the depth D of at least one of the grooves 130 may be at least: about fifty (50) percent; about one hundred (100) percent; about one hundred and fifty (150) percent; about two hundred (200) percent; or about three hundred (300) percent of the width W of at least one of the grooves 130. In addition, the depth D of at least one of the grooves 130 may be about fifty (50) percent to about one hundred and fifty (150) percent; or about one hundred (100) percent of the width W of at least one of the grooves 130. In other configurations, the depth D of one or more of the grooves 130 and the width W of one or more of the grooves 130 may be larger or smaller relative to each other.

Figure 1E:
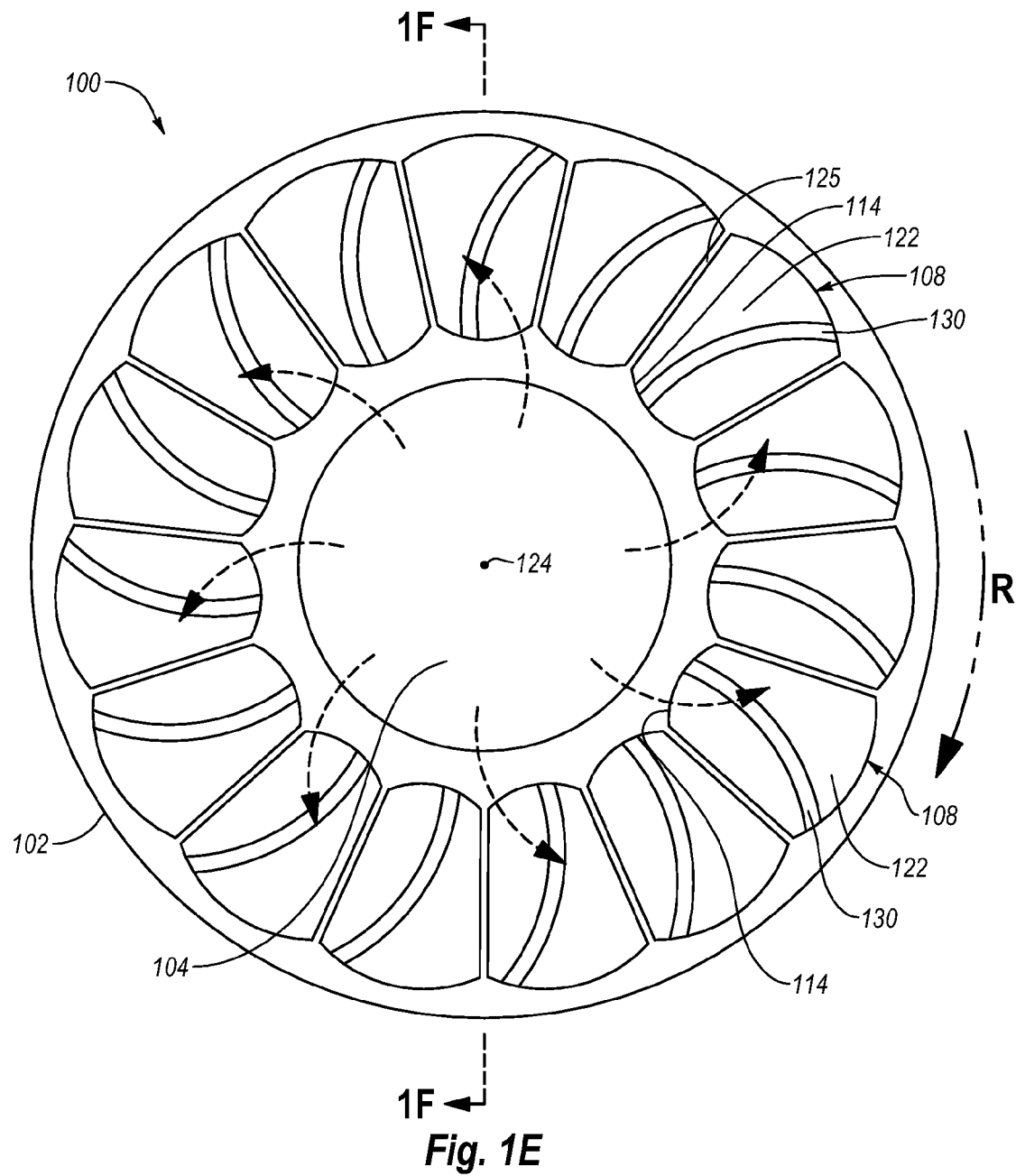
FIG. 1E is a top plan view of a thrust-bearing assembly according to an embodiment.
Figure 1F:
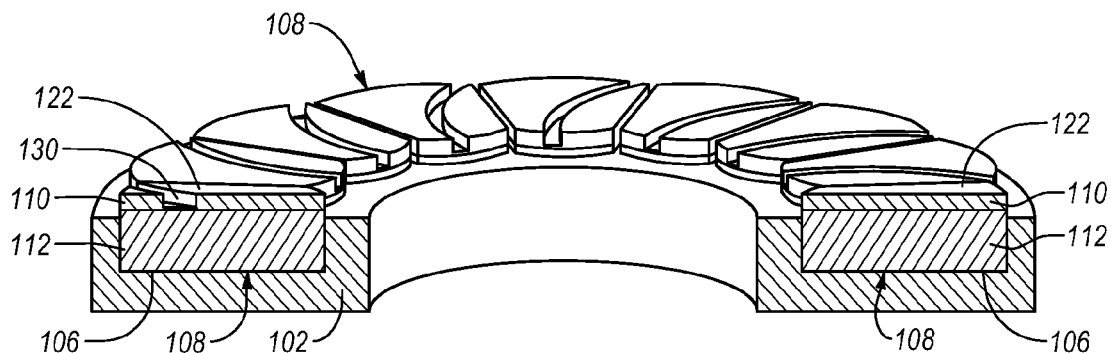
FIG. 1F is an isometric cutaway view taken along line 1F-1F of the thrust-bearing assembly shown in FIG. 1D.

Referring now to FIG. 1D, the superhard bearing elements 108 may be circumferentially distributed about the thrust axis 124 such that the groove 130 of each superhard bearing element 108 may be oriented in a first curvature direction (i.e., the groove 130 extends from the first end surface 118 along a path that curves toward the rotational direction R). In another embodiment, as shown in FIG. 1E, the groove 130 of each superhard bearing element 108 may be oriented in a second curvature direction (i.e., the groove 130 extends from the first end surface 118 along a path that curves away from a rotational direction R). As shown by flow direction arrows, when the support ring 102 rotates in direction R, the grooves 130 may pump lubricating fluid flowing out from the center opening 104 of the support ring 102 therethrough. In addition, the grooves 130 may help cool the superhard bearing elements 108 by increasing the surface area of the bearing surface 122 and/or the superhard bearing element 108 in contact with the lubricating fluid and/or agitating flow of the lubricating fluid.

In an embodiment, the grooves 130 of some of the superhard bearing elements 108 may be oriented in the first curvature direction while the grooves 130 of other superhard bearing elements 108 may be oriented in the generally opposite second curvature direction. Such a configuration may allow the grooves 130 to pump lubricating fluid onto the bearing surfaces 122 of the superhard bearing elements 108 in the first curvature direction, the second curvature direction, or both directions. Accordingly, wear on the superhard bearing elements 108 may be significantly reduced because of multi-directional lubrication.

FIG. 2A is an isometric view of a superhard bearing element 208 according to an embodiment. The superhard bearing element 208 may include a superhard table 210 bonded to a substrate 212 including a first side surface 214, a second side surface 216, a first end surface 218, a second end surface 220, and a bearing surface 222 of the superhard table 210 extending between the first end surface 218 and the second end surface 220. The superhard bearing element 208 may be made from any of the materials discussed above for the superhard bearing elements 108. In the illustrated embodiment, the superhard bearing element 208 may have a wedge-like shape. In other embodiments, however, the superhard bearing element 208 may have a generally rectangular shape, a generally round rectangular shape, a generally oval shape, a generally circular shape, a generally triangular shape, or the like.

The superhard bearing element 208 may include a groove 230 formed in the bearing surface 222. The groove 230 may have a generally v-shaped shape including a first portion forming an angle θ relative to a second portion. In an embodiment, the angle θ between the first portion and the second portion may be about 20 degrees to 170 degrees, about 30 degrees to 160 degrees, or about 40 degrees to 150 degrees. In other embodiments, the angle θ between the first and second portions may be larger or smaller. The v-shape of the groove 230 may help pump lubricating fluid onto the bearing surface 222 by directing the lubricating fluid onto the bearing surface 222 at or near the angle formed in the groove 230. In addition, the v-shape of the groove 230 may help cool the superhard bearing element 208 by increasing the fluid flow between the bearing surface 222 and/or the superhard bearing element 208 in contact with the lubricating fluid and/or creating turbulent flow within the lubricating fluid.

In an embodiment, the groove 230 may be formed in the bearing surface 222 between the first end surface 218 and the second end surface 220. In other embodiments, the groove 230 may extend through only a portion of the bearing surface 222. For example, the groove 230 may extend between the first end surface 218 and an intermediate point between the first end surface 218 and the second end surface 220.

FIG. 2B is a front elevation view of the superhard bearing element 208. As illustrated in FIG. 2B, the groove 230 may include sidewalls that form a generally v-shaped cross-section. In other embodiments, the groove 230 may have a generally parabolic cross-section, a generally u-shaped cross-section, a generally circular cross-section, a generally rectangular cross-section, a generally rounded rectangular shape, a generally trapezoidal cross-section, combinations thereof, or the like.

FIG. 3A is an isometric view of a superhard bearing element 308 according to an embodiment. The superhard bearing element 308 may include a superhard table 310 bonded to a substrate 312 including a first side surface 314, a second side surface 316, a first end surface 318, a second end surface 320, and a bearing surface 322 of the superhard table 310 extending between the first end surface 318 and the second end surface 320. In an embodiment, the superhard bearing element 308 may include a peripherally-extending edge chamfer. However, in other embodiments, a portion of the peripherally-extending edge chamber or all of the peripherally-extending edge chamfer may be omitted. The superhard bearing element 308 may be made from any of the materials discussed above for the superhard bearing elements 108. In the illustrated embodiment, the superhard bearing element 308 may have a wedge-like shape. In other embodiments, however, the superhard bearing element 308 may have a generally rectangular shape, a generally rounded rectangular shape, a generally oval shape, a circular shape, a generally triangular shape, or the like.

As shown, the superhard bearing element 308 may include two grooves 330 formed in the bearing surface 322, however, in other embodiments; the superhard bearing elements 308 may include one, three, four, or any number of grooves 330. The grooves 330 may have a generally linear geometry. In other embodiments, the grooves 330 follow a generally arcuate path, a generally curved path, a generally v-shaped path, a generally s-shaped path, generally u-shaped path, or the like. As shown, the grooves 330 may include a peripherally-extending edge chamfer. However, in other embodiments, a portion of the peripherally-extending edge chamber or all of the peripherally-extending edge chamfer may be omitted.

In an embodiment, each of the grooves 330 may be generally parallel to one another. In other embodiments, the grooves 330 may be generally non-parallel to one another. In an embodiment, the grooves 330 may help cool the superhard bearing elements 308 by increasing fluid flow between the bearing surface 322 and/or the superhard bearing element 308 in contact with the lubricating fluid. In addition, the grooves 330 may help pump lubricating fluid onto the bearing surfaces 322 by providing more than one flow path for the lubricating fluid onto the bearing surfaces 322.

As illustrated, each of the grooves 330 may include a generally rectangular cross-section defined at least partially by a bottom portion and opposing sidewalls. In other embodiments, the grooves 330 may have a generally parabolic cross-section, a generally circular cross-section, a generally rectangular cross-section, a generally u-shaped cross-section, a generally trapezoidal cross-section, combinations thereof, or the like. In an embodiment, the grooves 330 may include smooth and/or irregular surfaces to influence lubrication and/or cooling of the superhard bearing element 308. For example, in an embodiment, at least one sidewall and/or bottom portion of the grooves 330 may include portions having irregular surfaces configured to improve heat dissipation by increasing turbulent flow of the lubricating fluid.

Figure 4A:
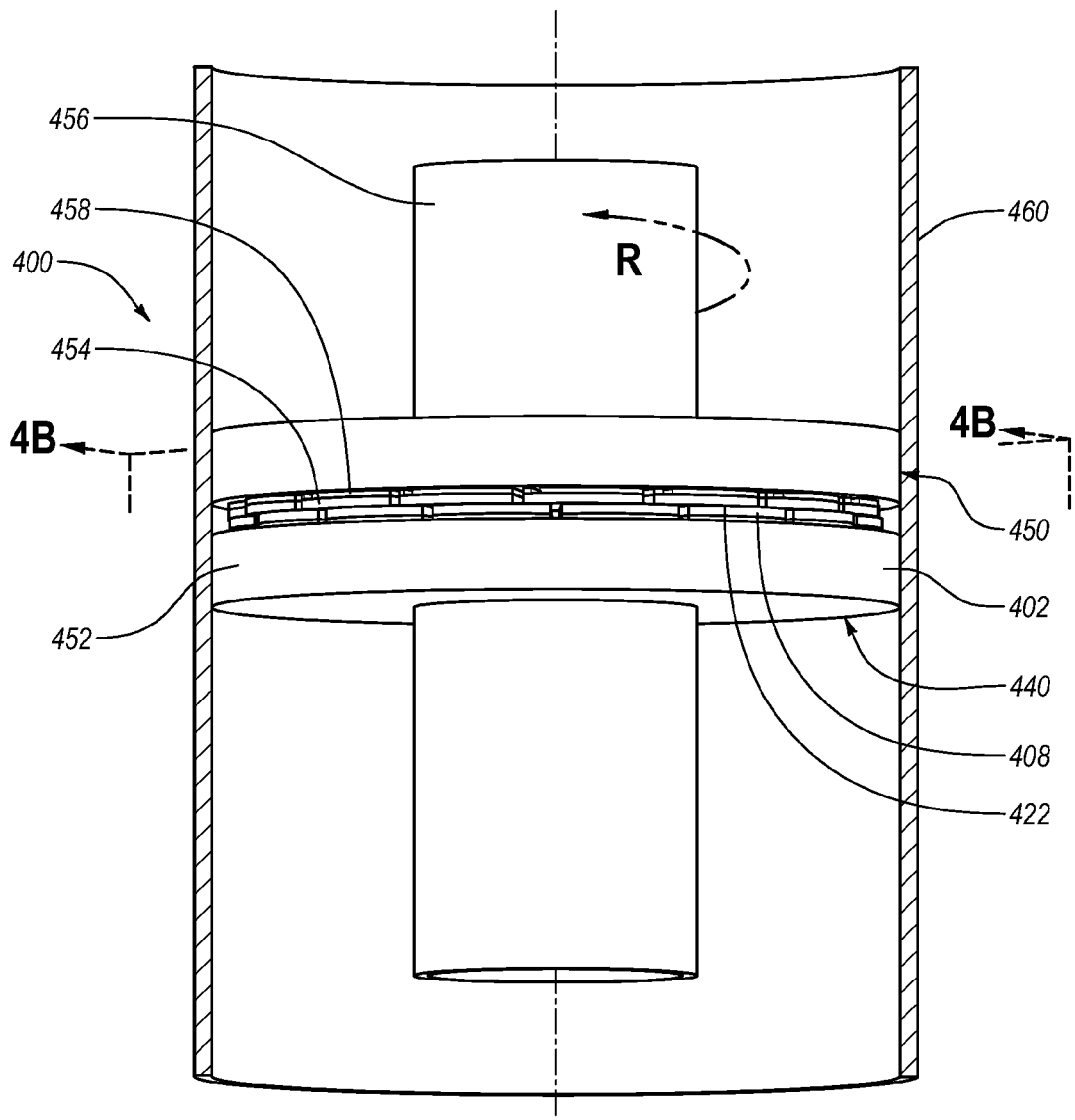
FIG. 4A is an isometric view of a thrust-bearing apparatus that may employ any of the disclosed thrust-bearing assemblies according to an embodiment, with the housing shown in cross-section.

Any of the above-described thrust-bearing assembly embodiments may be employed in a thrust-bearing apparatus. FIG. 4A is an isometric view of a thrust-bearing apparatus 400. The thrust-bearing apparatus 400 may include a stator 440 configured as any of the previously described embodiments of thrust-bearing assemblies. The stator 440 may include a plurality of circumferentially-adjacent superhard bearing elements 408. The superhard bearing elements 408 may include a bearing surface 422 and at least some of the superhard bearing elements 408 may exhibit, for example, the configuration of the superhard bearing elements 108. The superhard bearing elements 408 may be mounted or otherwise attached to a support ring 402. The thrust-bearing apparatus 400 further may include a rotor 450. The rotor 450 may include a support ring 452 and a plurality of superhard bearing elements 458 mounted or otherwise attached to the support ring 452, with each of the superhard bearing elements 458 having a bearing surface 454. As shown, a shaft 456 may be coupled to the support ring 452 and operably coupled to an apparatus capable of rotating the shaft 456 in a direction R (or in a generally opposite direction), such as a downhole motor. For example, the shaft 456 may extend through and may be secured to the support ring 452 of the rotor 450 by press-fitting or threadly coupling the shaft 456 to the support ring 452 or another suitable technique. A housing 460 may be secured to the support ring 402 of the stator 440 and may extend circumferentially about the shaft 456 and the rotor 450.

Figure 4B:
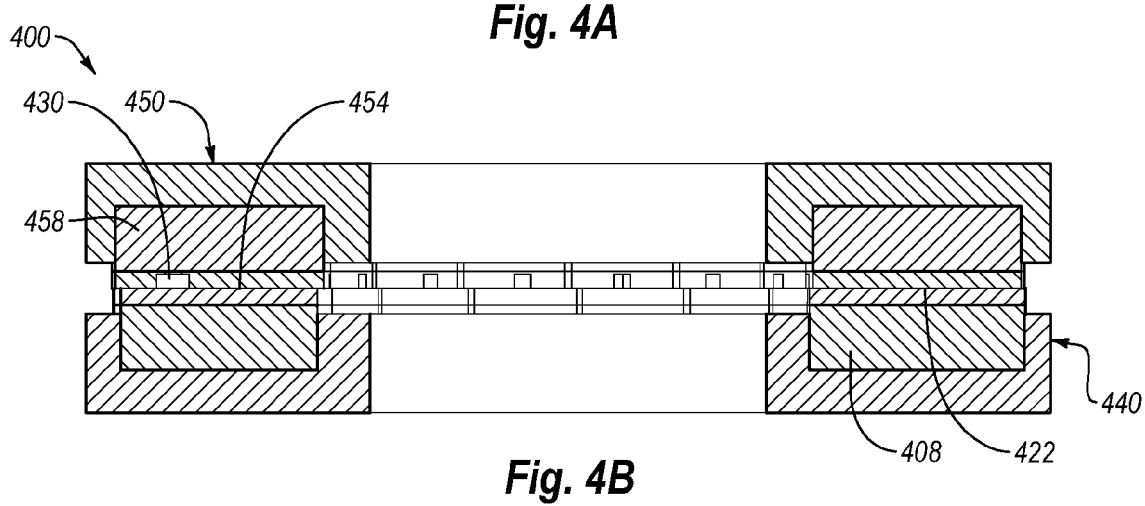
FIG. 4B is a cross-sectional view of the thrust-bearing apparatus shown in FIG. 4A taken along line 4B-4B.

The operation of the thrust-bearing apparatus 400 is discussed in more detail with reference to FIG. 4B. FIG. 4B is a cross-sectional view in which the shaft 456 and housing 460 are not shown for clarity. In operation, lubricating fluid, drilling fluid, or mud may be pumped between the shaft 456 and the housing 460, and between the superhard bearing elements 458 of the rotor 450. Grooves 430 of the superhard bearing elements 458 of the rotor 450 may help pump lubricating fluid between the bearing surfaces 422 of the stator 440 and the bearing surfaces 454 of the rotor 450 which in turn can greatly reduce friction between the bearing surfaces 422 of the stator 440 and the bearing surfaces 454 of the rotor 450. The grooves 430 may also help cool the superhard bearing elements 458 of the rotor 450 by increasing the surface area of the superhard bearing elements 458 and/or the bearing surfaces 454 in contact with the lubricating fluid. Moreover, under certain operational conditions the thrust-bearing apparatus 400 may be operated as a hydrodynamic bearing. For example, where the rotational speed of the rotor 450 is sufficiently great and the thrust load is sufficiently low, a fluid film may develop between the bearing surfaces 422 of the stator 440 and the bearing surfaces 454 of the rotor 450. The fluid film may have sufficient pressure to reduce or prevent contact between the respective bearing surfaces 422, 454 and thus, substantially reduce wear of the superhard bearing elements 458 and the superhard bearing elements 408. In such a situation, the thrust-bearing apparatus 400 may be described as operating hydrodynamically. Thus, the thrust-bearing apparatus 400 may be operated to improve lubrication of the contact area between the bearing surfaces 422 of the stator 440 and the bearing surfaces 454 of the rotor 450 and/or as a hydrodynamic bearing.

Figure 5A:
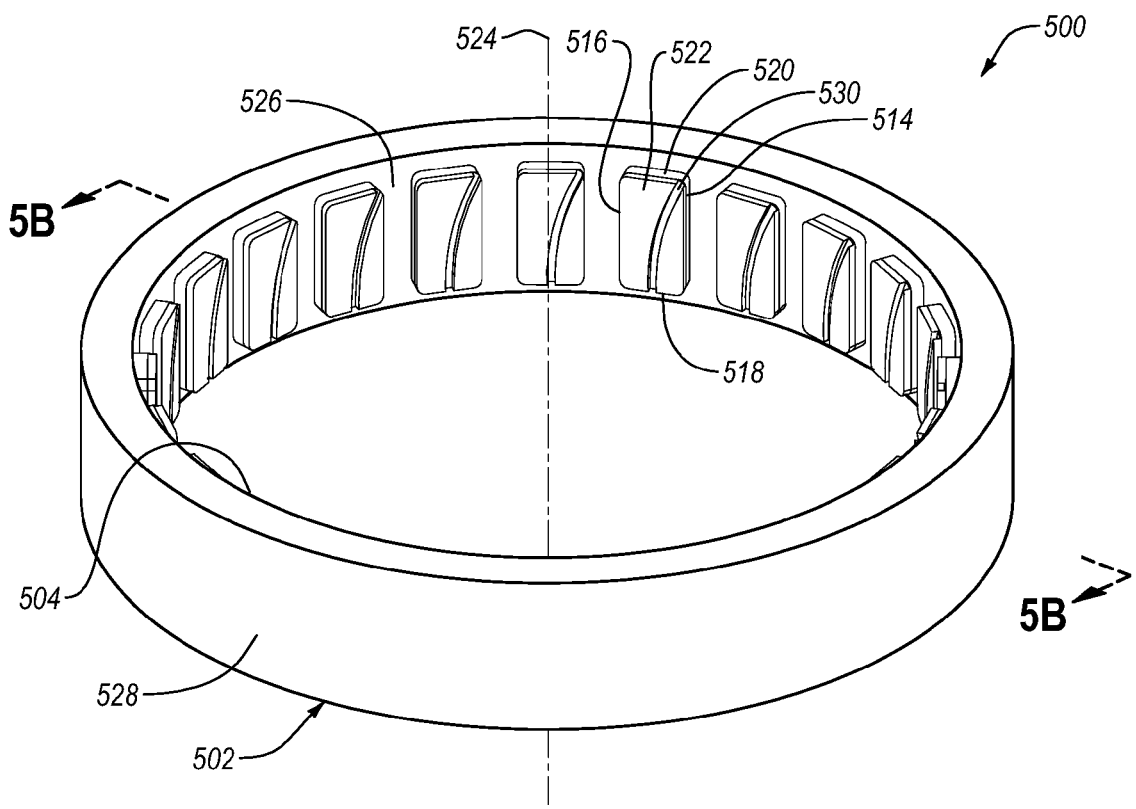
FIG. 5A is an isometric view of a radial bearing assembly according to an embodiment.
Figure 5B:
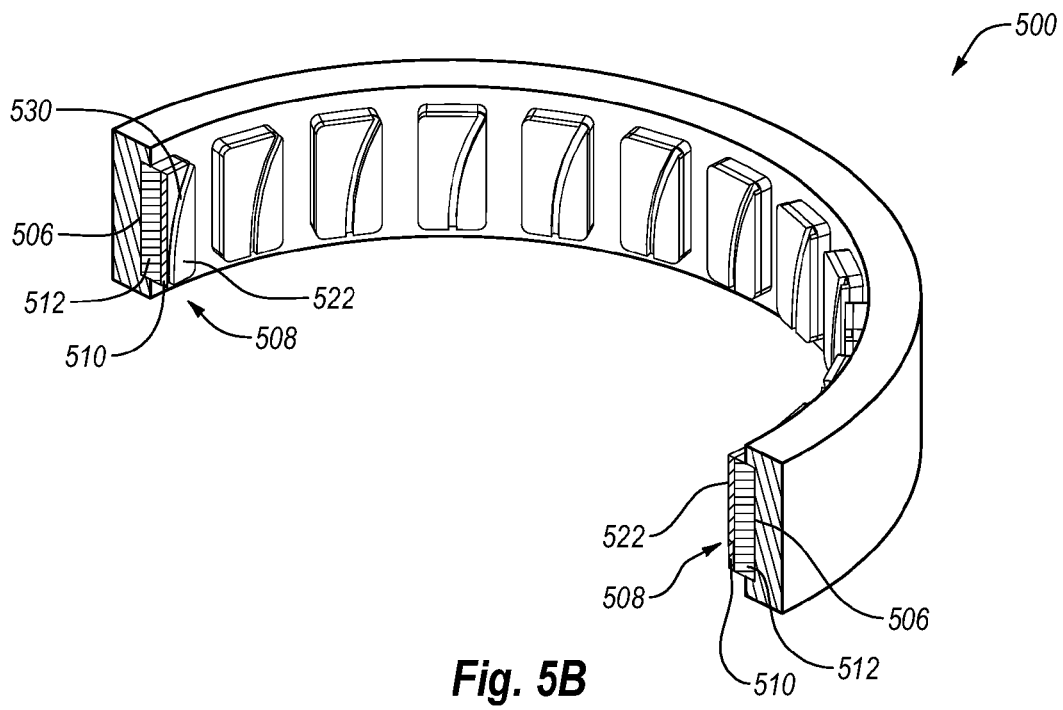
FIG. 5B is an isometric cutaway view of the radial bearing assembly shown in FIG. 5A taken along line 5B-5B.

The concepts used in the thrust-bearing assemblies and apparatuses described above may also be employed in the radial bearing assemblies and apparatuses. FIGS. 5A and 5B are isometric and isometric cutaway views, respectively, illustrating a radial bearing assembly 500 according to an embodiment. The radial bearing assembly 500 may include a support ring 502 extending about a rotation axis 524. The support ring 502 may include an inner peripheral surface 526 defining a central opening 504 that is capable of receiving, for example, an inner support ring or inner race. The support ring 502 may also include an outer peripheral surface 528. A plurality of superhard bearing elements 508 may be distributed circumferentially about the rotation axis 524. Each superhard bearing element 508 may include a superhard table 510 including a concavely-curved bearing surface 522 (e.g., curved to lie on an imaginary cylindrical surface). Each superhard table 510 may be bonded or attached to a corresponding substrate 512 (shown in FIG. 5B). The superhard bearing elements 508 have a generally rounded rectangular shape and each made from any of the materials discussed above for the superhard bearing elements 108. In other embodiments, the superhard bearing elements 508 may have a non-cylindrical shape, generally wedge-like shape, a generally oval-like shape, a circular shape or any other suitable shape. Similar to the superhard bearing elements 108, the superhard bearing elements 508 may include a first side surface 514, a second side surface 516, a first end surface 518, a second end surface 520, with the bearing surface 522 extending between the first end surface 518 and the second end surface 520. In an embodiment, at least some of the superhard bearing elements 508 may include a groove 530 formed in the bearing surface 522. The grooves 530 may be configured similar to the grooves 130, 230, 330, or any other groove disclosed herein. As illustrated in FIGS. 5A and 5B, the superhard bearing elements 508 may be distributed circumferentially about the rotation axis 524 in corresponding recesses 506 formed in the support ring 502 and arranged in a single row. In other embodiments, the superhard bearing elements 508 may be circumferentially distributed in two rows, three rows, four rows, or any number of rows.

FIG. 6 is an isometric cutaway view of a radial bearing apparatus 600 according to an embodiment. The radial bearing apparatus 600 may include an inner race 682 (i.e., a rotor). The inner race 682 may define an opening 684 and may include a plurality of circumferentially-adjacent superhard bearing elements 686 distributed about a rotation axis 624, each of which includes a convexly-curved bearing surface 688. The radial bearing apparatus 600 may further include an outer race 690 (i.e., a stator) that extends about and receives the inner race 682. The outer race 690 may include a plurality of circumferentially-adjacent superhard bearing elements 608 distributed about the rotation axis 624, each of which includes a concavely-curved bearing surface 622 curved to correspond to the convexly-curved bearing surfaces 688. The superhard bearing elements 608 and 686 may have a generally rounded rectangular shape and each may be made from any of the materials discussed above for the superhard bearing elements 108. In other embodiments, the superhard bearing elements 608 and 686 may have a generally wedge-like shape, a generally oval shape, or any other suitable shape. The terms "rotor" and "stator" refer to rotating and stationary components of the radial bearing apparatus 600, respectively. Thus, if the outer race 690 is configured to remain stationary, the outer race 690 may be referred to as the stator and the inner race 682 may be referred to as the rotor.

At least some of the superhard bearing elements 686 may include a groove 630 formed in the bearing surface 688. The grooves 630 may be configured to help pump lubricating fluid onto the bearing surfaces 688 of the superhard bearing elements 686 and/or the bearing surfaces 622 of the superhard bearing elements 608. Moreover, under certain operating conditions that grooves 630 may help form a fluid film similar to the grooves of the superhard bearing elements shown in FIGS. 4A and 4B. A shaft or spindle (not shown) may extend through the opening 684 and may be secured to the rotor 682 by press-fitting the shaft or spindle to the rotor 682, threadly coupling the shaft or spindle to the rotor 682, or another suitable technique. A housing (not shown) may also be secured to the stator 690 using similar techniques.

The radial bearing apparatus 600 may be employed in a variety of mechanical applications. For example, so-called "rotary cone" rotary drill bits, pumps, transmissions or turbines may benefit from a radial bearing apparatus discussed herein.

It is noted that the outer race 690 of the radial bearing apparatus 600 is shown including a plurality of circumferentially-distributed superhard bearing elements 608 without grooves. However, in other embodiments, an outer race of a radial bearing apparatus may include a plurality of circumferentially-distributed superhard bearing elements, each of which may include a groove, as previously described, configured to help lubricate and/or cool the superhard bearing elements of the outer race during operation.

Figure 7:
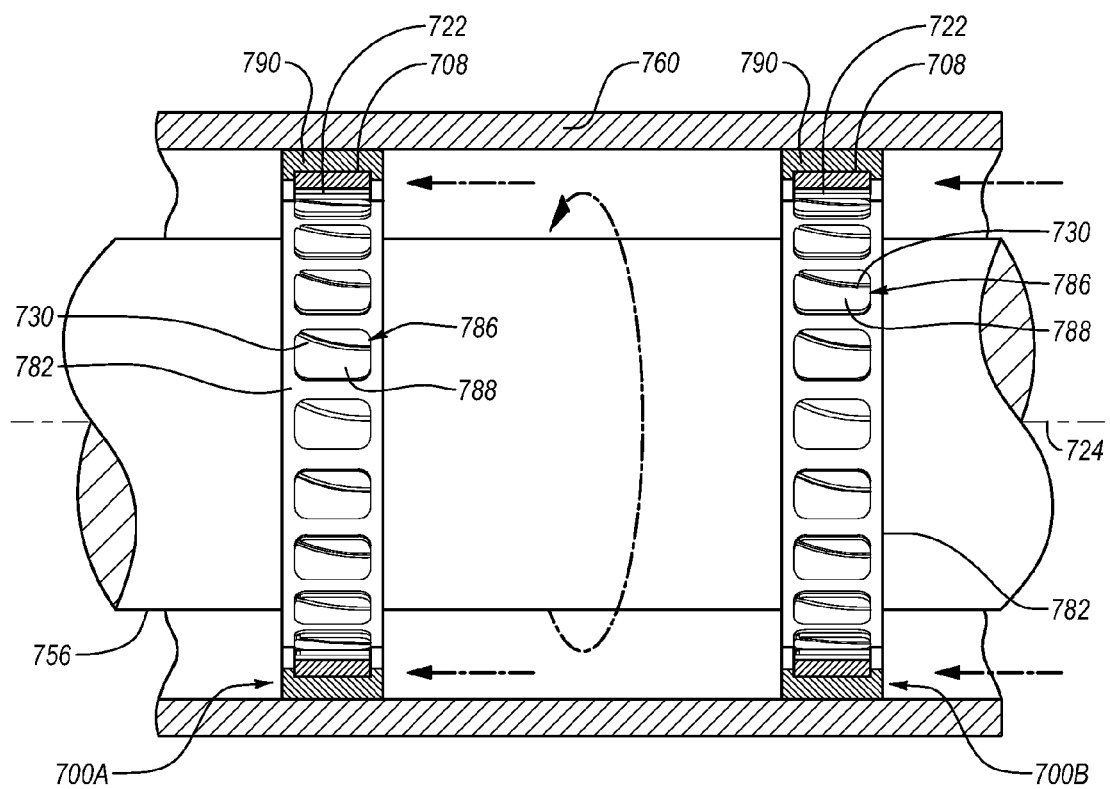
FIG. 7 is an isometric cutaway view of two radial bearing apparatuses that may utilize any of the disclosed radial bearing assemblies according to various embodiments.

FIG. 7 is an isometric cutaway view of two radial bearing apparatuses 700A, 700B according to another embodiment. The radial bearing apparatuses 700A, 700B may include an inner race 782 (i.e., rotor). The inner race 782 may include a row of circumferentially-distributed superhard bearing elements 786, each of which includes a convexly-curved bearing surface 788. In other embodiments, the inner race 782 may include two rows, three rows, or any number of rows of the superhard bearing elements 786.

The radial bearing apparatuses 700A, 700B may further include an outer race 790 (i.e., a stator) that extends about and receives the inner race 782. The outer race 790 may include one row of circumferentially-distributed superhard bearing elements 708, each of which includes a concavely-curved bearing surface 722 curved to correspond to the convexly-curved bearing surfaces 788. In other embodiments, the outer race 790 may include two rows, three rows, or any number of rows of the superhard bearing elements 708.

The superhard bearing elements 708 and 786 may have a generally rounded rectangular shape and each may be made from any of the materials discussed above for the superhard bearing elements 108. The terms "rotor" and "stator" refer to rotating and stationary components of the radial bearing apparatuses 700A, 700B, respectively. Thus, if the outer race 790 is configured to remain stationary, the outer race 790 may be referred to as the stator and the inner race 782 may be referred to as the rotor.

At least some of the superhard bearing elements 786 may include a groove 730 formed in the bearing surface 788. The grooves 730 may be oriented in a rotational direction R of the inner race 782 about a rotation axis 724 (i.e., the groove 730 extends along a path that curves toward the rotational direction R) to help pump lubricating fluid onto the bearing surfaces 788 and/or the bearing surfaces 722. A shaft or spindle 756 may extend through each inner race 782 and may be secured to each inner race 782 by press fitting the shaft or spindle 756 to the inner races 782, threadly coupling the shaft or spindle 756 to the inner races 782, or another suitable technique. A housing 760 may also be secured to the outer race 790 using similar techniques. The radial bearing apparatuses 700A, 700B may be employed in a variety of mechanical applications. For example, drill motors and pumps may benefit from the radial bearing apparatuses 700A, 700B.

In operation, rotation of the shaft 756 may cause rotation of the inner race 782 relative to the outer race 790. Lubricating fluid may be pumped between the bearing surfaces 788 of the inner race 782 as shown by the flow arrows. Similar to the description with respect to the thrust bearing apparatus 400, the grooves 730 of the superhard bearing elements 786 may help pump lubricating fluid between the bearing surfaces 788 of the superhard bearing elements 786 and/or the bearing surfaces 722 of the superhard bearing elements 708. Moreover, the grooves 730 of the superhard bearing elements 786 may help cool the superhard bearing elements 786 and/or the superhard bearing elements 708. Accordingly, wear on the superhard bearing elements 708, 786 may be reduced.

It is noted that in other embodiments, the rotor or stator may be configured as any of the previously described embodiments of thrust-bearing assemblies. Moreover, the disclosed thrust-bearing apparatuses may be used in a number of applications such as downhole motors in subterranean drilling systems, directional drilling systems, pumps, transmissions, gear boxes, and many other applications.

Figure 8:
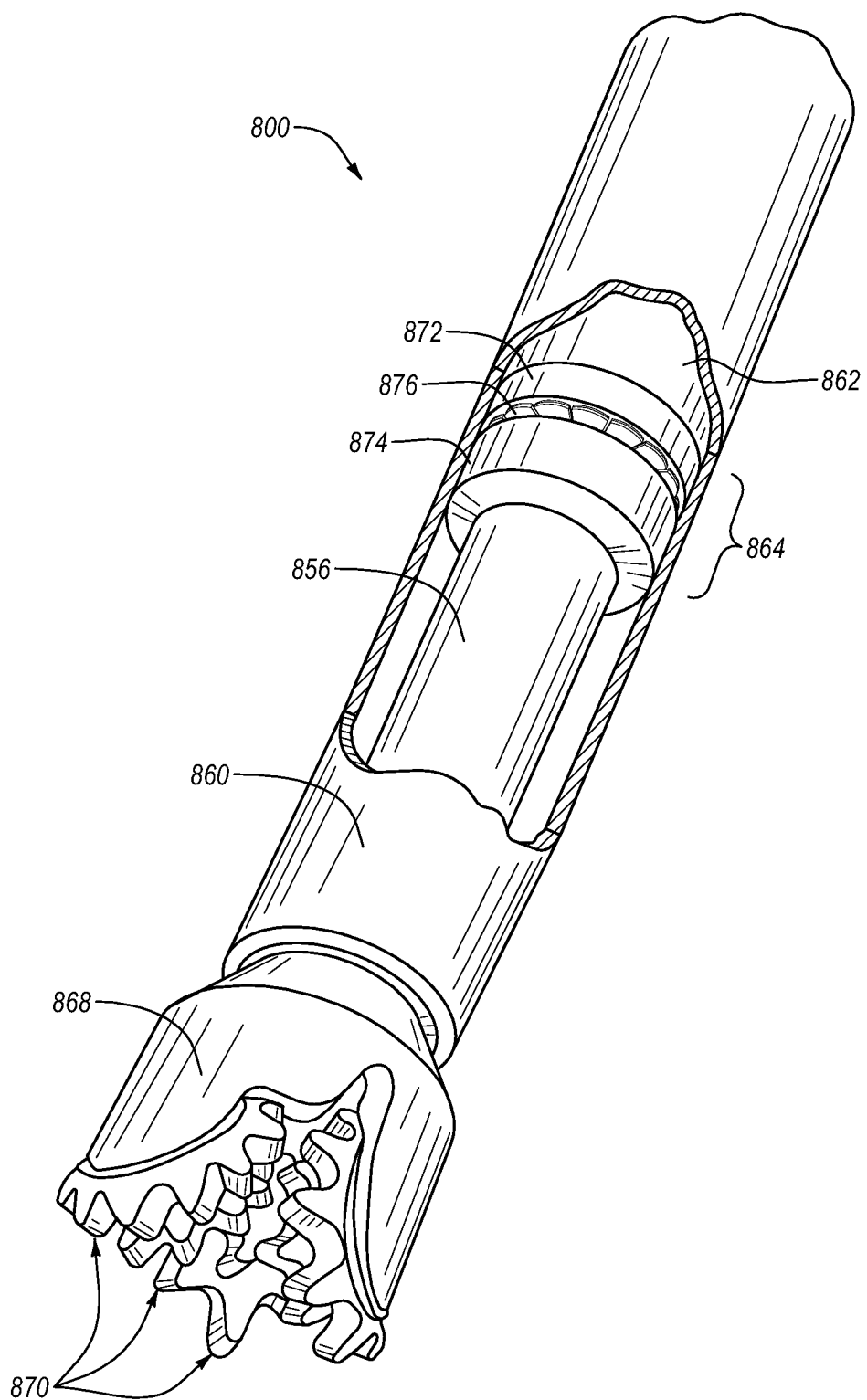
FIG. 8 is a schematic isometric cutaway view of a subterranean drilling system that may utilize any of the disclosed bearing assemblies according to various embodiments.

Any of the embodiments for bearing apparatuses discussed above may be used in a subterranean drilling system. FIG. 8 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-bearing apparatus 864 may be operably coupled to the downhole drilling motor 862. The thrust-bearing apparatus 864 may be configured as any of the previously described thrust-bearing apparatus embodiments. A rotary drill bit 868 may be configured to engage a subterranean formation and drill a borehole and may be connected to the output shaft 856. The rotary drill bit 868 is shown as a roller cone bit including a plurality of roller cones 870. However, other embodiments may utilize different types of rotary drill bits, such as so-called "fixed cutter" drill bits. As the borehole is drilled, pipe sections may be connected to the subterranean drilling system 800 to form a drill string capable of progressively drilling the borehole to a greater size or depth within the earth.

The thrust-bearing apparatus 864 may include a stator 872 that does not rotate and a rotor 874 that may be attached to the output shaft 856 and rotates with the output shaft 856. As discussed above, the thrust-bearing apparatus 864 may be configured as any of the embodiments disclosed herein. For example, the stator 872 may include a plurality of circumferentially-distributed superhard bearing elements 876 similar to the superhard bearing elements 408 shown and described in the thrust-bearing apparatus 400 of FIG. 4A. The rotor 874 may include a plurality of circumferentially-distributed superhard bearing elements (not shown) such as shown and described in FIGS. 1A-3.

In operation, drilling fluid may be circulated through the downhole drilling motor 862 to generate torque and effect rotation of the output shaft 856 and the rotary drill bit 868 attached thereto so that a borehole may be drilled. A portion of the drilling fluid may also be used to lubricate opposing bearing surfaces of the stator 872 and the rotor 874. When the rotor 874 is rotated, grooves of the superhard bearing elements of the rotor 874 may pump the drilling fluid onto the bearing surfaces of the stator 872 and/or the rotor 874, as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a plurality of superhard bearing elements distributed circumferentially about an axis, each of the plurality of superhard bearing elements including a bearing surface, at least one of the plurality of superhard bearing elements including one or more arcuate grooves having an arcuate bath formed in the bearing surface thereof, the one or more arcuate grooves defining a path length, a bottom portion, and a depth extending between the bearing surface and the bottom portion, at least one of the arcuate grooves having a non-uniform depth; and
   a support ring that carries the plurality of superhard bearing elements.

2. The bearing assembly of claim 1 wherein the one or more arcuate grooves are positioned and configured to pump lubricating fluid onto the bearing surfaces of one or more of the plurality of superhard bearing elements.

3. The bearing assembly of claim 1 wherein the one or more arcuate grooves are configured to increase a surface area of the bearing surfaces in contact with lubricating fluid.

4. The bearing assembly of claim 1 wherein the one or more arcuate grooves follow a generally curved path, a generally semi-cylindrical path, or combination thereof.

5. The bearing assembly of claim 1 wherein at least a portion of the one or more arcuate grooves includes a cross-sectional area at least partially defined between opposing sidewalls of the one or more arcuate grooves, the cross-sectional area having a generally v-shaped geometry, a generally parabolic geometry, or a generally rectangular geometry.

6. The bearing assembly of claim 1 wherein the bath length of the one or more arcuate grooves is about forty (40) percent to about one hundred forty (140) percent of a length of the plurality of superhard bearing elements.

7. The bearing assembly of claim 1 wherein the bath length of the one or more arcuate grooves is about four hundred (400) percent to eight hundred (800) percent of the depth of the one or more arcuate grooves.

8. The bearing assembly of claim 1 wherein at least one of the plurality of superhard bearing elements further comprises a substrate and a polycrystalline diamond table bonded to the substrate, the polycrystalline diamond table having a thickness.

9. The bearing assembly of claim 8 wherein a depth of the one or more arcuate grooves is about ten (10) percent to one hundred twenty (120) percent of the thickness of the polycrystalline diamond table.

10. The bearing assembly of claim 9 wherein a depth of the one or more arcuate grooves is about forty (40) percent to one hundred (100) of the thickness of the polycrystalline diamond table.

11. The bearing assembly of claim 1 wherein at least one of the plurality of superhard bearing elements comprises a non-cylindrical superhard bearing element.

12. The bearing assembly of claim 1 wherein the axis is a thrust axis, and wherein the support ring and the plurality of superhard bearing elements define a thrust-bearing assembly; or wherein the axis is a rotation axis, and wherein the support ring and the plurality of superhard bearing elements define a radial bearing assembly.

13. The bearing assembly of claim 1 wherein the plurality of the superhard bearing elements are brazed, interference-fitted, or fastened to the support ring.

14. A bearing assembly, comprising:
a plurality of superhard bearing elements distributed circumferentially about an axis, each of the plurality of superhard bearing elements including:
- a first end surface and a second end surface positioned generally opposite the first end surface;
- a first side surface extending between the first end surface and the second end surface;
- a second side surface positioned generally opposite the first side surface;
- a bearing surface extending between the first end surface, the second end surface, the first side surface, and the second side surface;
- at least one of the plurality of superhard bearing elements including one or more grooves formed in the bearing surface extending at and from the first end surface to the second end surface; and
a support ring that carries the plurality of superhard bearing elements.

15. The bearing assembly of claim 14 wherein the one or more grooves comprise one or more arcuate grooves having an arcuate path, the one or more arcuate grooves defining a path length, a bottom portion, and a depth extending between the bearing surface and the bottom portion.

16. The bearing assembly of claim 15 wherein the path length is more than one hundred (100) percent of a length of the plurality of superhard bearing elements.

17. The bearing assembly of claim 15 wherein at least one of the plurality of superhard bearing elements further comprises a substrate and a superhard table bonded to the substrate, the superhard table having a thickness.

18. The bearing assembly of claim 17 wherein the superhard table includes a polycrystalline diamond table.

19. The bearing assembly of claim 18 wherein the depth of the one or more arcuate grooves is more than one hundred (100) percent the thickness of the polycrystalline diamond table.

20. A bearing assembly, comprising:
a plurality of superhard bearing elements distributed circumferentially about an axis, each of the plurality of superhard bearing elements including a bearing surface, at least one of the plurality of superhard bearing elements having a substrate and a superhard table bonded to the substrate, the superhard table having a thickness, the at least one of the plurality of superhard bearing elements including one or more arcuate grooves having an arcuate path formed in the bearing surface, the arcuate path defining a path length, the one or more arcuate grooves having a depth of more than one hundred (100) percent the thickness of the superhard table; and
a support ring that carries the plurality of superhard bearing elements.

21. The bearing assembly of claim 20 wherein the superhard table on the at least one of the plurality of superhard bearing elements comprises a polycrystalline diamond table.

22. The bearing assembly of claim 21 wherein at least one of the plurality of superhard bearing elements includes:
- a first end surface and a second end surface positioned generally opposite the first end surface;
- a first side surface extending between the first end surface and the second end surface;
- a second side surface positioned generally opposite the first side surface;
- the bearing surface extending between the first end surface, the second end surface, the first side surface, and the second side surface;
- the one or more arcuate grooves extending between the first end surface and the second end surface.

23. The bearing assembly of claim 22 wherein the depth is non-uniform.

24. The bearing assembly of claim 23 wherein the non-uniform depth is defined by a greater depth at the first end surface and a shallower depth at the second end surface.

25. The bearing assembly of claim 24 wherein the path length of the one or more arcuate grooves is about forty (40) percent to about one hundred forty (140) percent of a length of the plurality of superhard bearing elements.

\* \* \* \* \*

UNITED STATES PATENT AND TRADEMARK OFFICE
CERTIFICATE OF CORRECTION

PATENT NO.        : 8,668,388 B1
APPLICATION NO.   : 13/306332
DATED             : March 11, 2014
INVENTOR(S)       : Peterson Page 1 of 1

It is certified that error appears in the above-identified patent and that said Letters Patent is hereby corrected as shown below:

In the Claims

In Column 16, Claim 1, Line 12, delete "bath" and insert -- path --, therefor.

In Column 16, Claim 6, Line 35, delete "bath" and insert -- path --, therefor.

In Column 16, Claim 7, Line 39, delete "bath" and insert -- path --, therefor.

Signed and Sealed this
Twenty-first Day of July, 2015

Michelle K. Lee
*Director of the United States Patent and Trademark Office*